July 14, 1931.  J. M. WEED  1,814,878
ARC WELDING ELECTRODE
Filed Jan. 13, 1925
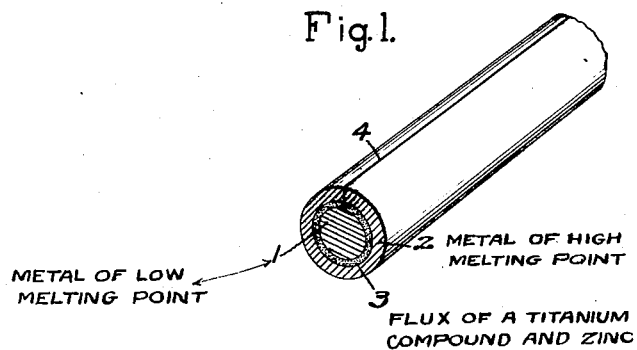
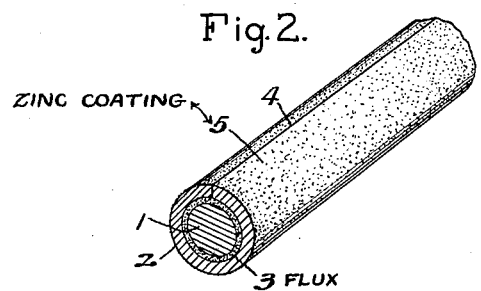
Inventor:
James M. Weed,
by *Alexander S. Lunt*
His Attorney.

Patented July 14, 1931

1,814,878

UNITED STATES PATENT OFFICE

JAMES M. WEED, OF SCHENECTADY, NEW YORK, ASSIGNOR TO GENERAL ELECTRIC COMPANY, A CORPORATION OF NEW YORK

ARC WELDING ELECTRODE

Application filed January 13, 1925. Serial No. 2,208.

My invention relates to electrodes for electric arc welding, and particularly to electrodes provided with material for giving the arc improved characteristics. Those materials, which have arc sustaining properties and to some extent assist in protecting the deposited metal from oxidation, are commonly called fluxes.

An object of my invention is to provide an electrode having a flux which shall enable the arc to be easily held and manipulated for manual arc welding and which shall also be advantageous for automatic and semi-automatic arc welding. Automatic and semi-automatic arc welding is now well known to the art and is characterized by the fact that automatic means are provided for feeding the electrode to maintain the arc. In fully automatic machines, means are also provided for producing relative movement between the arc and the work to be welded along the line of the joint to be welded. In semi-automatic machines this movement along the line of the joint to be welded is manually performed. In manual arc welding the operator usually uses electrodes of relatively short length which are clamped in an electrode holder and the operator manually feeds the electrode toward the work to maintain the arc length as constant as possible and also manually traverses the arc along the line of the joint to be welded. In automatic and semi-automatic welding the electrode is customarily used in the form of a continuous wire which may be several hundred feet in length and drawn from a reel as it is used.

A further object of my invention is to provide an electrode which shall be particularly advantageous for overhead welding; that is, for welding from the underside of a seam to be welded.

My invention will be better understood from the following description taken in connection with the accompanying drawings, and its scope will be pointed out in the appended claims.

Fig. 1 shows an embodiment of my invention in which the flux is contained in the electrode, and Fig. 2 shows an embodiment which is the same as Fig. 1 except that the electrode is provided with a galvanized coating which not only serves to protect the electrode against rusting but also serves as a flux during welding.

Referring to Fig. 1, the electrode is shown as comprising a core 1 and a one-piece continuous sheath 2 with the welding flux 3 contained between the core and sheath. The sheath 2 is folded about the core 1 and the edges of the sheath closely abut along the line 4. The flux 3 is firmly held between the sheath and core. This type of electrode is claimed in my application for electrodes and methods of making the same, Serial No. 384,339, filed May 26, 1920, Letters Patent No. 1,525,840, dated February 10, 1925.

In accordance with my present invention, the operation of the electrode is improved by adding to the electrode a flux constituent which has a particularly beneficial effect on the action of the arc. It has heretofore been proposed to use a flux containing a titanium compound, for example, a compound of titanium and an alkali metal, as disclosed in Letters Patent to James C. Armor, No. 1,374,711, dated April 12, 1921. I prefer to use such a flux, preferably a sodium titanate, and also provide the electrode with a small amount of zinc. The amount of zinc can be varied within fairly wide limits. I at present prefer to use a flux which comprises about two parts of zinc to one part of sodium titanate. Metallic zinc may be reduced to a finely divided state and mixed with the sodium titanate flux and introduced between the core of the electrode and the sheath, as in Fig. 1. My invention is not, however, limited to applying the zinc to the electrode as in Fig. 1 since the zinc may be applied to the sheath of the electrode as a coating, as by galvanizing or electroplating. The zinc may also be applied as a coating in the same way to the core of the electrode.

Fig. 2 represents an embodiment of my invention which may be the same as Fig. 1 with the exterior of the electrode provided with a coating 5 as just described.

My invention in its broader aspects is not limited to the particular construction of electrode shown in Figs. 1 and 2 since the flux may be applied in other ways. For example, the core of the electrode may be omitted and the sheath made thicker and the flux may fill the interior of the sheath, or the electrode may be solid and the flux applied externally in any desired manner, or the electrode may be a rod with an internal bore containing the flux. Where a core and sheath are used, it is apparent that the sheath may be spirally wound or otherwise applied to the core.

It is apparent that an externally galvanized electrode not only contributes the element for improving the action of the arc but also prevents the electrode from rusting and insures a good conducting surface on the electrode so that the electrode, whether used in short lengths for hand welding or in continuous lengths for machine welding, has all of the advantages of an ordinary bare electrode.

My invention in its broader aspects is not limited to the combination in the electrode of zinc with a flux containing a titanium compound. Tin may be incorporated in the electrode and also be applied externally as for example by the galvanizing process. Zinc and tin may also be incorporated in the electrode by being mixed with the titanium compound. Zinc and tin are to be considered alternate materials in the welding flux, although my present opinion is that zinc with the titanium compound gives superior results to those obtained with tin. Tin and zinc without the titanium compound will secure good results with both a long and short arc.

With the flux containing zinc and titanium, as heretofore described, the arc is easy to hold and manipulate and either very short arcs or very long arcs may be used. In ordinary metallic arc welding the arc held by a manual welder ordinarily has a length corresponding to an arc voltage of from 18 to 22 volts for bare electrodes. In machine welding, the arc voltage is ordinarily from 12 to 15 volts. I have successfully done automatic arc welding with my electrode with an arc voltage of 8 volts and I have successfully welded with an arc voltage as high as 30 volts. An arc at this length with ordinary bare electrodes is out of the question since the arc is very unstable and wanders prohibitively and the metal is oxidized or burned. With my electrode, for relatively heavy work which is to be done at high speed I prefer to use an arc voltage between 20 and 25 volts. Thus the most efficient voltage is above the upper limit practicable with ordinary bare electrodes.

The arc with my electrode is steady and has a concentrated stream of small cross-section so that the arc resembles a high pressure gas flame blowing from the tip of the electrode onto the work. It possesses great penetration. I have, for instance, welded plates one-half inch in thickness without beveling the abutting edges by merely one passage of the arc along the seam where the edges of the plates are butted together, the speed at which the arc traversed along this seam being approximately 3 inches a minute. There is a complete absence of flaring and sputtering of the arc, resulting in a smooth finished appearance of the weld. Anything from a flush surface to a heavily crowned surface may be obtained by varying the length of the arc and the speed of travel. A flush weld, giving normal strength is obtained with maximum speed and using the minimum amount of electrode material. A crowned weld gives extra strength at the expense of reduced speed and increased quantity of the electrode material. The elimination of sputtering not only results in a neat weld, but it also reduces the loss of electrode material to a minimum. Disturbances due to magnetic effect, which are so annoying with ordinary electrodes, are almost entirely absent. Any tendency of the electrode to stumble is practically eliminated. This result is demonstrated when automatically welding parts which have been previously tacked together at intervals along the line of the joint to be welded. After the arc has passed along the seam, the position of the tacks is scarcely discernible. A wide adjustment in current values is possible. The electrode possesses perfect arcing characteristics with small currents and it operates just as perfectly with currents of practically double the value ordinarily used with the same sizes of electrodes. This makes it possible to use the same electrode to advantage on relatively light work or heavy work, within wide limits. With large currents and the high arc voltages practicable, correspondingly large amounts of energy are developed in the arc. This accounts in part for the great penetration and the high speeds of welding which may be secured.

For ordinary ferrous metal welding, the core and sheath of the electrode may be made of any of the grades of steel or iron suitable for welding electrodes, but for overhead welding it is preferable to make the sheath of a metal having a higher melting point than the core. While an expert welder can do excellent overhead welding with the sheath and core constructed of metal of the same melting point, it is necessary that he be able to hold a short arc. If the arc be accidentally lengthened, a drop of molten metal is likely to flow down the side of the electrode. After this happens the electrode behaves much like a candle after a drop of melted wax flows over the side. It is almost impossible to stop the metal from running down except by cutting off the end of the electrode or taking a new electrode. By making the sheath of higher melting point than the core this difficulty is overcome with the type of eletcrode shown in Figs. 1 and 2. I have obtained successful results, for example, using a sheath corresponding to the composition for electrodes published in Bulletin No. 2 of the American Welding Society, issued April 1, 1920, revised May 1, 1921, namely:

Carbon, not over_____0.06
Manganese, not over_____0.15
Phosphorus, not over_____0.04
Sulphur, not over_____0.04
Silicon, not over_____0.08 and a core consisting of a commercial grade of open hearth basic steel containing larger percentages of carbon, manganese and silicon, thereby reducing the melting point of the core below that of the sheath. For work other than overhead work it is satisfactory to make the core and sheath of the same material, although of course different materials or alloys may be used where it is desired to impart particular characteristics to the deposited metal. These particular characteristics may also be imparted by combining metallic or non-metallic elements or compounds with the flux, for example, powdered carbon, various metallic carbides, aluminum, ferro-titanium, ferro-vanadium, silicon zirconium alloy, ferro-manganese, etc.

What I claim as new and desire to secure by Letters Patent in the United States is:—

1. An electrode for arc welding comprising a metal to be deposited and a flux containing approximately one part of a titanate to two parts of a metal of the class constituted by the metals zinc and tin.

2. An arc welding electrode comprising a metal to be deposited and a flux containing one part of sodium titanate to two parts of metallic zinc.

3. An arc welding electrode adapted for overhead welding comprising a metallic core, a continuous one-piece metallic sheath of higher melting point than said core completely enclosing said core for preventing molten metal flowing down the side of said electrode, and an arc sustaining flux included between said sheath and said core.

4. An arc welding electrode comprising a galvanized ferrous metal core, a ferrous metal sheath, and a flux containing a titanate enclosed in said electrode between said core and said sheath.

5. An arc welding electrode comprising a ferrous metal core, a ferrous metal sheath for enclosing said core, and a flux of substantially one part of sodium titanate to two parts of zinc, said sodium titanate being enclosed in said electrode between said core and said sheath and said zinc being supplied as a coating on said core.

6. An arc welding electrode of ferrous metal having associated therewith a flux containing approximately one part of a titanate of an alkaline metal to two parts of metallic zinc, the zinc being present in the electrode as a thin coating on the ferrous metal.

7. An arc welding electrode of ferrous metal galvanized with a metal of the class constituted by the metals zinc and tin.

In witness whereof, I have hereunto set my hand this 12th day of January, 1925.

JAMES M. WEED.